United States Patent [19]
Akira

[11] Patent Number: 5,748,285
[45] Date of Patent: May 5, 1998

[54] PHOTOGRAPHIC PRINTING APPARATUS AND METHOD FOR ACCURATELY PRINTING FRAME NUMBERS ON PRINT PAPER

[75] Inventor: Toshiro Akira, Wakayama, Japan

[73] Assignee: Noritsu Koki Co., Ltd., Wakayama, Japan

[21] Appl. No.: 547,540

[22] Filed: Oct. 24, 1995

[30] Foreign Application Priority Data

Oct. 27, 1994 [JP] Japan .................. 6-264143

[51] Int. Cl.$^6$ ........................... G03B 27/46
[52] U.S. Cl. .................. 355/39; 355/40; 355/41
[58] Field of Search ................. 355/39, 40, 41, 355/42, 43, 35, 67, 68, 69, 71

[56] References Cited

U.S. PATENT DOCUMENTS

| | | | |
|---|---|---|---|
| 5,122,645 | 6/1992 | Saeki et al. | 235/462 |
| 5,128,519 | 7/1992 | Tokuda | 235/375 |
| 5,157,437 | 10/1992 | Takenaka | 355/41 |
| 5,164,574 | 11/1992 | Ujiie et al. | 235/462 |
| 5,253,011 | 10/1993 | Zahn | 355/41 |
| 5,336,873 | 8/1994 | Imamura | 235/462 |

*Primary Examiner*—R. L. Moses
*Assistant Examiner*—Shival Virmani
*Attorney, Agent, or Firm*—Wenderoth, Lind & Ponack

[57] ABSTRACT

The present invention relates to a photographic printing apparatus and method in which an image is printed on the front of a print paper and a respective frame number is printed on the back of the print paper at a predetermined position for a plurality of frames of a negative film. The present invention accounts for situations in which the frame number fails to be retrieved from location data existing on the negative film. This is achieved by examining and computing information for a group of data assigned before and after the particular frame in question.

2 Claims, 3 Drawing Sheets

PHOTOGRAPHIC PRINTING APPARATUS AND METHOD FOR ACCURATELY PRINTING FRAME NUMBERS ON PRINT PAPER

BACKGROUND OF THE INVENTION

The present invention relates to a photographic printing apparatus and method for printing a negative film having a track extending lengthwise along which location data for each frame is recorded in order.

In conventional photographic processing machines such as a printer, location data, including the number of a particular frame being processed is needed for processing a negative film.

For example, the number of a frame printed is printed on the back of its print in a photographic printer. Prior to typing the frame number, the frame number, as location data, has to be read from the negative film. As shown in FIG. 2, a negative film 6 has a track extending lengthwise thereon along which data is recorded 61 e.g. of a bar-code form. The data, which indicates the frame numbers as well as DX codes or other processing data, is aligned at intervals of a given distance.

The arrangement of conventional photographic printers is substantially similar to that shown in FIG. 1 and its description will be made referring to FIG. 1. During operation of the conventional photographic printer, the data recorded 61 on a negative film 6 is read by a data reader 2 so that the number of each frame as well as a DX code of the processing data is identified as location data. The processing data is transferred to an exposure station 4 for determining exposure settings for printing the frames. The frame number which represents a frame which will soon be located at the exposure station 4 is utilized, if necessary, for compensation positioning with respect to the location of the data reader 2 and the exposure station 4. The frame number is also fed to a location data writer 71 where the frame number is typed on the back of a print paper 8 which has a printed image of the frame on the front.

More specifically, an image is printed on the front of a print paper at a printing station 7 and the frame number is printed on the back of the same at a predetermined position. This allows the frame to be easily located on the negative film if desired in the future.

The present invention accounts for situations in which the frame number fails to be retrieved from the bar-code data, or when the data reader 2 fails to read frame number data. This is achieved by examining and computing information for a group of data records 61 assigned before and after the particular frame in question.

Although the conventional photographic printers anticipate the number of a target frame by calculation when the frame number fails to be retrieved from the bar-code information read with a data reader, they fail to perform compensating operations even if the frame number retrieved is not for the target frame. Therefore, there still exists the possibility of having printing errors.

It is an object of the present invention, in view of the foregoing problems, to provide a method and apparatus for correcting frame numbers if a particular number retrieved does not correspond to the target frame to be printed.

SUMMARY OF THE INVENTION

A method of determining location data in a photographic printing apparatus, according to the present invention, is provided in which while a negative film, having a lengthwise extending track thereon along which the location data of each frame is recorded, is transferred in a lengthwise direction, frames of the negative film are printed in a sequence on sheets of a photosensitive material in an exposure station and, simultaneously, the location data of the frames are read from the negative film and are printed on the sheets of the photosensitive material in the same sequence. In particular, the method comprises the steps of: reading a plurality of the location data recorded in different locations on the negative film and storing them in sequence; calculating three or more location data from the plurality of the location data by examining the location on the negative film of a frame which is located at the exposure station; and determining the location data of the frame to be printed on the sheet of the photosensitive material by implementing a majority rule in which one of the at least three calculated location data which is identical for a maximum of the at least three calculated location data is selected.

A photographic printing apparatus according to the present invention is provided in which a negative film, while having a lengthwise extending track thereon along which the location data of each frame is recorded, is transferred in a lengthwise direction, its frames are printed in sequence on sheets of a photosensitive material in an exposure station and simultaneously, the location data of the frames are read from the negative film and are printed out on the sheets of the photosensitive material in the same sequence. Specifically, the apparatus comprises: a photosensitive sensor for reading a plurality of the location data recorded in different locations on the negative film; a memory for storing the plurality of the location data in sequence; a comparator number extractor for calculating three or more location data from the plurality of the location data by examining the location on the negative film of a frame which is located at the exposure station; and a processor for determining the location data of the frame to be printed on the sheet of the photosensitive material by implementing majority rule using the three or more calculated location data.

According to the method of the present invention in which the negative film, while having the lengthwise extending track thereon along which the location data of each frame is recorded, is being transferred in a lengthwise direction, its frames are printed in sequence on the sheets of the photosensitive material in the exposure station and simultaneously, the location data of the frames are read from the negative film and are printed out on the sheets of the photosensitive material in the same sequence, a group of the location data recorded in different locations on the negative film are read and stored, thus allowing most of them to be correctly identified even if a few may unsuccessfully be read.

Then, three or more location data are calculated from the group of the location data by examining the location on the negative film of a frame which is located at the exposure station.

This is followed by determining the location data of the frame to be printed on the sheet of the photosensitive material by implementing the majority rule using the three or more calculated location data. As the result, the location data can correctly be obtained for all the frames regardless of unsuccessful reading of a few of them.

According to the photographic printing apparatus of the present invention, in which the negative film, while having the lengthwise extending track thereon along which the location data of each frame is recorded, is transferred in a lengthwise direction, its frames are printed in sequence on the sheets of the photosensitive material in the exposure station and simultaneously, the location data of the frames are read from the negative film and typed out on the sheets of the photosensitive material in the same sequence, a group of the location data recorded in different locations on the negative film are read by the photosensitive sensor and stored in the sequence into the memory thus allowing most of them to be correctly identified even if a few may unsuccessfully be read.

The comparator number extractor then calculates three or more location data from the group of the location data by examining the location on the negative film of a frame which is located at the exposure station.

Finally, the processor determines the location data of the frame to be printed on the sheet of the photosensitive material by implementing the majority rule using the three or more calculated location data. As the result, the location data can correctly be obtained for all the frames regardless of unsuccessful reading of a few of them.

DETAILED DESCRIPTION OF THE PREFERRED EMBODIMENT

A photographic printing apparatus embodying the present invention will be described in detail referring to the accompanying drawings.

Figure 1:
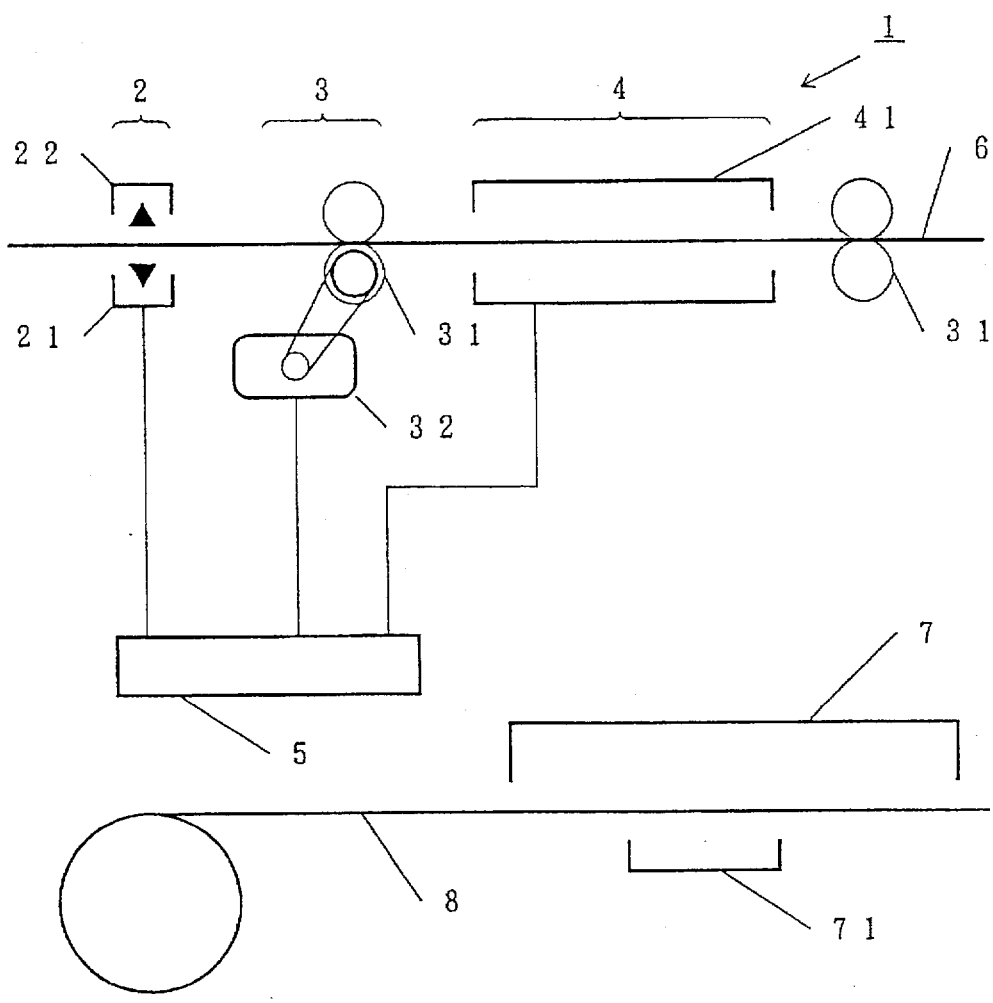
FIG. 1 is a schematic view of a photographic printing apparatus according to the present invention.

As shown in FIG. 1, a photographic printing apparatus for printing a negative film 6 is provided which comprises a data reader 2, a transfer mechanism 3, an exposure station 4, a controller 5, and a printing station 7.

Figure 2:
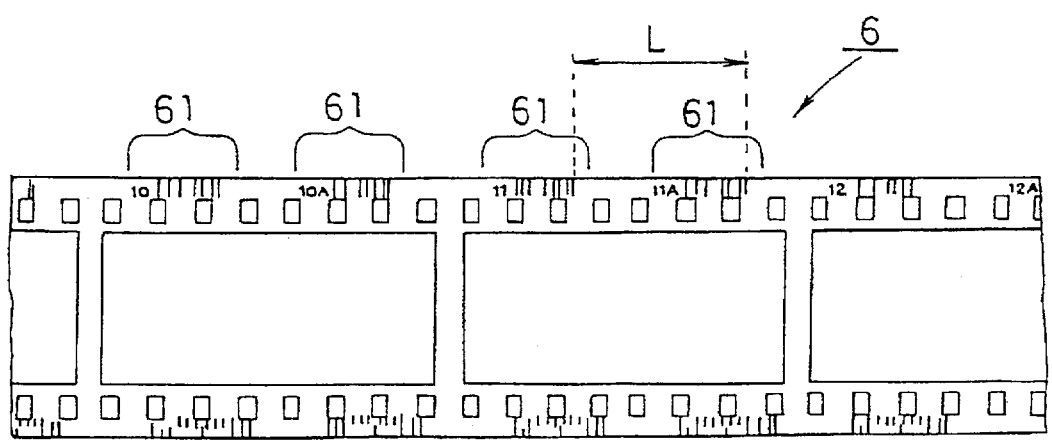
FIG. 2 is a plan view of a negative film to be handled in the photographic printing apparatus.

As shown in FIG. 2, the negative film 6 has a plurality of recorded data 61 in the form of a bar-code arranged at intervals of a predetermined distance L for expressing location data such as the number of particular frames and processing data for particular frames, e.g. DX codes. It is noted that two sets of recorded data 61 are assigned to each frame in this embodiment.

The data reader 2 comprises a photosensitive sensor 21 and a light source 22 for the sensor 21. A ray of light emitted from the light source 22 is passed through the recorded data 61 of the negative film 6 and is received by the photosensitive sensor 21 which in turn produces pulse signals corresponding to the bar-code information for each recorded data 61.

The transfer mechanism 3 comprises two or more rollers 31 and a drive motor 32 for driving the rollers 31.

The exposure station 4 includes a negative mask 41. The distance from the sensor 21 in the data reader 2 to the center of the negative mask 41 is 8×L which is equivalent, in the length, to four standard frames, eight half-size frames, or four panorama-size frames. This distance is preset.

The exposure operation is controlled by the controller 5.

Figure 3:
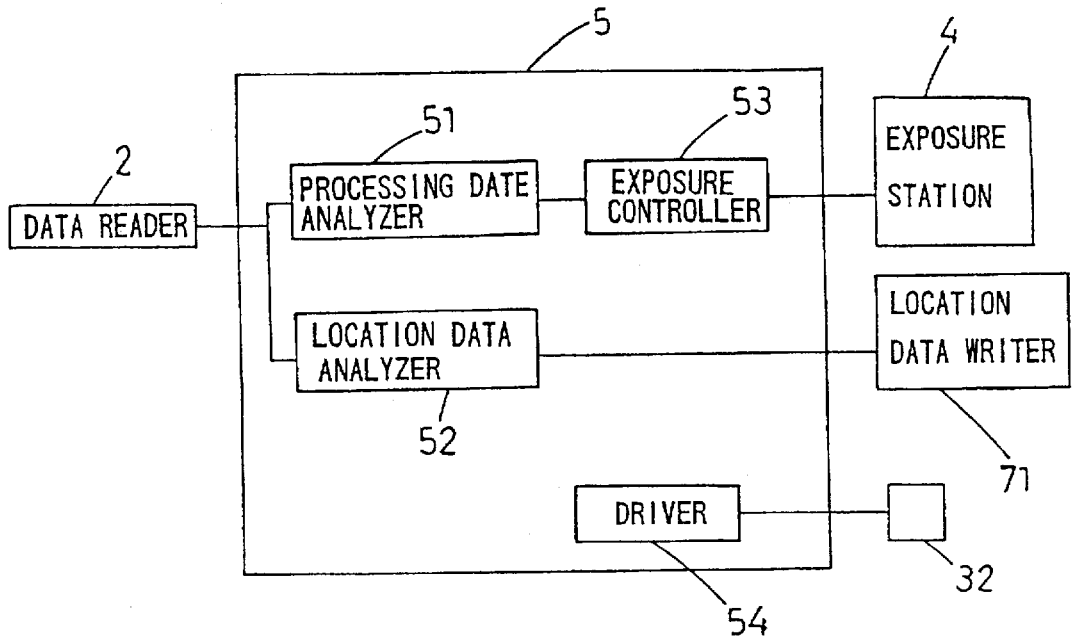
FIG. 3 is a block diagram of a circuitry arrangement of the photographic printing apparatus.
Figure 4:
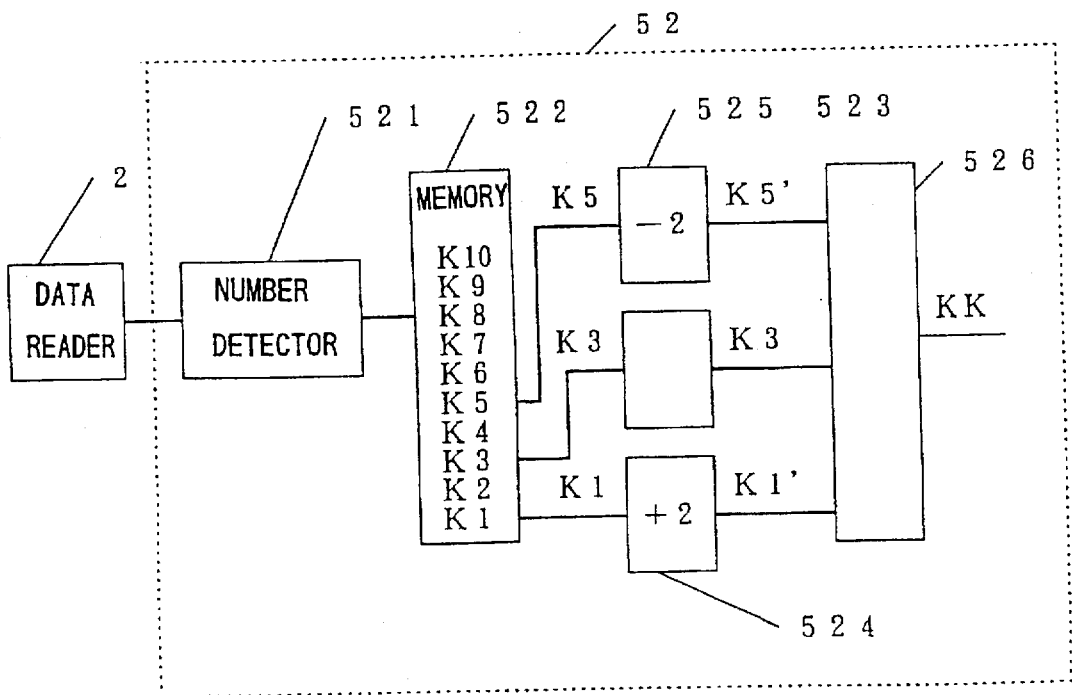
FIG. 4 is a block diagram showing a primary part of the circuitry arrangement of the photographic printing apparatus.

The exposure operation will be described in more detail referring to FIGS. 3 and 4 as well as FIGS. 1 and 2.

The controller 5 comprises a processing data analyzer 51, a location data analyzer 52, an exposure controller 53, and a driver 54.

The processing data analyzer 51 is responsive to the pulse signal from the data reader 2 for examining DX codes of the negative film and for identifying the sensitivity and the name of a film manufacturer.

The exposure controller 53 determines exposure settings for the negative film 6 in accordance with information of the DX codes. The exposure settings are fed to the exposure station 4 for controlling an irradiation of exposure light over a photographic print paper 8 in the printing station 7.

The location data analyzer 52 is also responsive to the pulse signal from the data reader 2 for identifying the number of a frame to be printed and for typing the frame number on the back of the print paper 8 in the location data writer 71.

The driver 54 is adapted for monitoring the pulse signal from the data reader 2 and controlling the transfer operation of the drive motor 32 such that a frame-by-frame movement or 2×L forward movement of the negative film 6 occurs so that the frame to be printed is correctly located at the negative mask 41 in the exposure station 4.

The location data analyzer 52 comprises a number detector 521 for detecting the number of each frame from the pulse signal of the data reader 2, a memory 522 for storage of the frame numbers of the ten latest frames, a number extractor 523 for extracting the frame number of the third frame K3 from the ten frame numbers stored in the memory 522, a first comparative number extractor 524 for extracting the frame number of the first frame K1 of the ten frame numbers and adding it with two to produce a sum or first comparative number K1', a second comparative number extractor 525 for extracting the frame number of the fifth frame K5 of the ten frame numbers and subtracting it by two to produce a difference or second comparative number K5', and a majority processor 526 for comparing the reference number K3, the first comparative number K1', and the second comparative number K5' to calculate a decision number KK. More particularly, when all three of the numbers are identical, the decision number KK is equal to K3. When two of the three numbers are identical, their value is released as the decision number KK. When the three numbers are different from each other, a decision error signal ER is released from the majority processor 526.

The memory 522 for holding the frame numbers of the ten frames K1 to K10 is arranged so as to update the frame numbers by deleting the oldest frame number upon receiving the frame number of a current frame. The memory may be designed with a ring memory format.

When the twelfth frame of the negative film 6 arrives at the exposure station 4, the memory 522 stores K1=11, K2=11A, K3=12, K4=12A, K5=13, K6=13A, K7=14, K8=14A, K9=15, and K10=15A. As apparent, the third frame K3 is 12.

Then, the first comparative number K1' is 12 as calculated by adding 11 of the first frame number K1 with 2. The second comparative number K5' is 12 as calculated by subtracting 2 from 13 of the fifth frame number K5. If the frame number is correctly read, it is established the first comparative number K1'=the second comparative number K5'=the third frame number K3=12. It should be noted that the calculation is made in such a manner that a sum of 12A and 2 is 14A and a subtraction of 2 from 12A is 10A.

Figure 5:
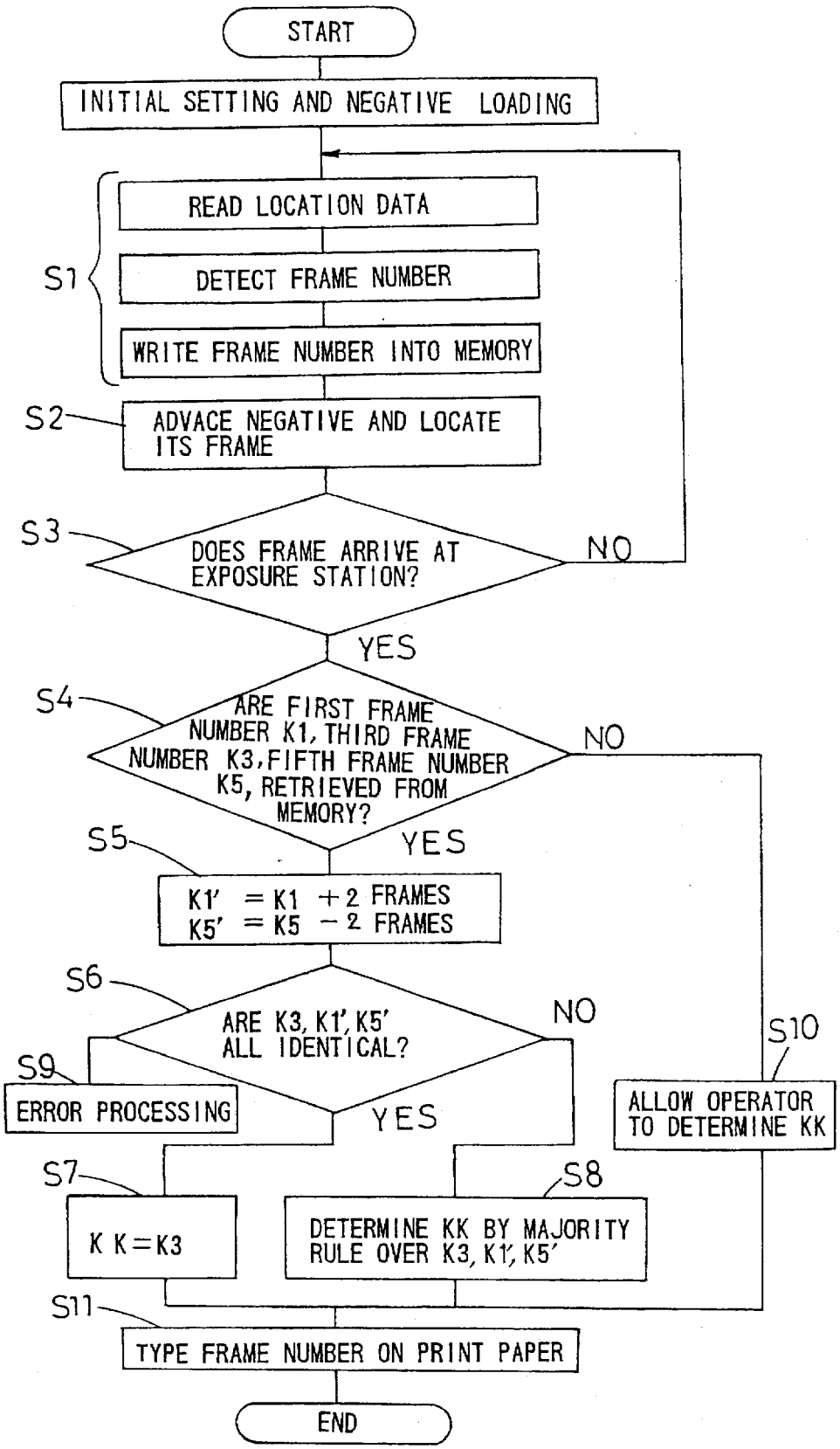
FIG. 5 is a flow chart showing operations of the photographic printing apparatus.

The operation of the above arrangement will be explained referring to the flow chart of FIG. 5.

The operation starts with an initial setting and loading of the negative film 6.

At step S1, the location data is read by the data reader 2 and the frame number in the location data is stored in the memory 522 separately.

The negative film 6 is advanced one frame at Step S2.

Steps S1 and S2 are repeated at Step S3 until the frame arrives at the exposure station 4. Upon the frame arriving at the exposure station 4, the operation proceeds to Step S4. At this point in the operation, the numbers of ten frames are stored in the memory 522.

At Step S4, the first or oldest frame number K1, the third frame number K3, and the fifth frame number K5 are retrieved from the ten frame numbers stored in the memory 522. If the frame numbers fail to be retrieved, the procedure moves to Step S10 for allowing an operator to identify the number of the frame.

At Step 5, the first and second comparative numbers K1' and K5' are calculated by adding the first frame number K1 with two and subtracting two from the fifth frame number K5 respectively.

The reference number K3, first comparative number K1' and the second comparative number K5' are examined at Step S6. If all the numbers are identical, the procedure advances to Step S7. If two of the three numbers are identical, the procedure goes to Step 8. If the three numbers are different from each other, the procedure moves to Step S9.

At Step S7, K3 is released as the decision number KK. At Step S8, the number determined by a majority rule is released as the decision number KK. At Step S9, the decision error signal ER is released requesting an error correcting operation.

Finally, the decision number KK is printed on the back of a print paper at Step S11.

The above procedure is repeated until all the frames on the negative film 6 have been printed. While the image of each frame is printed on the front of the print paper, respective frame numbers are printed on the back of the print paper.

When less than ten frames are available towards the end of the negative film 9, the decision number KK may be determined by decreasing the preceding frame numbers in succession.

As set forth above, the number of a current frame located at the exposure station 4 is determined by reading and examining the three frame numbers extracted from their respective bar-codes. If the three frame numbers are not identical, the frame number determined by the majority rule is released as the decision number KK. This allows the frame number to be correctly obtained regardless of obstacles of dirt or fogging on the bar-codes of the negative film.

The present invention prevents not only failure of detecting the frame number due to dirt or fogging but also accounts for the reading of incorrect frame numbers.

If the majority processor 526 delivers a decision error signal ER, the number of the frame located at the exposure station 4 may be determined by implementing the majority rule using frame numbers other than the above three frame numbers or by using four or more frame numbers. It is also possible to allow the operator to determine the frame number when the decision error signal ER is encountered.

It should be understood that the distance from the sensor 21 in the data reader 2 to the center of the negative mask 41 is not limited to 8×L. The location of the frames numbered by the memory 522 may be varied depending on the distance.

The functions of the processing data analyzer 51 and the location data analyzer 52 in the controller 5 may be implemented by a combination of a microcomputer and software programs.

We claim:

1. A method of determining location data for a plurality of image frames on a negative film having a lengthwise extending track upon which location data of each frame is recorded, wherein the negative film is transferred through a photographic printing apparatus during which location data is read for each image frame of the negative film in a sequential manner, and during which frames of the negative film and determined location data are simultaneously printed on a photosensitive material at an exposure station, said method comprising the steps of:

sequentially storing the location data read for image frames of the negative film;

conducting calculations on at least three of the location data stored, by said storing step with reference to a particular frame of the negative film which is positioned at the exposure station;

determining the location data of said particular frame of the negative film which is positioned at the exposure station by selecting one of the at least three calculated location data which is identical for a maximum of the at least three calculated location data; and repeating said storing, conducting calculations and determining steps for each image frame of the negative film that is positioned at the exposure station.

2. A photographic printing apparatus in which a negative film, having a lengthwise extending track upon which location data of each frame is recorded, is transferred through a photographic printing apparatus during which location data is read for each image frame of the negative film in a sequential manner, and during which frames of the negative film and determined location data are simultaneously printed on a photosensitive material at an exposure station, said apparatus comprising:

a detection means for sequentially reading the location data of image frames on the negative film;

a memory means for sequentially storing the location data read by said detection means;

a calculation means for conducting calculations on at least three of the location data stored in said memory means with reference to a particular frame of the negative film which is positioned at the exposure station; and a determining means for determining the location data of said particular frame of the negative film which is positioned at the exposure station by selecting one of the at least three calculated location data which is identical for a maximum of the at least three calculated location data.

* * * * *